United States Patent
Shimada

(10) Patent No.: US 11,264,673 B2
(45) Date of Patent: Mar. 1, 2022

(54) SEALING BODY AND NONAQUEOUS ELECTROLYTE SECONDARY BATTERY

(71) Applicant: Panasonic Intellectual Property Management Co., Ltd., Osaka (JP)

(72) Inventor: Toshiki Shimada, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 217 days.

(21) Appl. No.: 16/472,972

(22) PCT Filed: Dec. 13, 2017

(86) PCT No.: PCT/JP2017/044642
§ 371 (c)(1),
(2) Date: Jun. 24, 2019

(87) PCT Pub. No.: WO2018/123578
PCT Pub. Date: Jul. 5, 2018

(65) Prior Publication Data
US 2020/0194759 A1    Jun. 18, 2020

(30) Foreign Application Priority Data
Dec. 27, 2016  (JP) .............................. JP2016-254123

(51) Int. Cl.
*H01M 2/00* (2006.01)
*H01M 50/325* (2021.01)
(Continued)

(52) U.S. Cl.
CPC ..... *H01M 50/325* (2021.01); *H01M 10/0525* (2013.01); *H01M 50/186* (2021.01); *H01M 50/191* (2021.01)

(58) Field of Classification Search
CPC .... H01M 2/1229; H01M 2/1223; H01M 2/12; H01M 2/06; H01M 2/065; H01M 2/08; H01M 10/0525; H01M 10/052
See application file for complete search history.

(56) References Cited

U.S. PATENT DOCUMENTS

2016/0133900 A1* 5/2016 Li ...................... H01M 2/0237
429/56
2016/0133901 A1  5/2016 Li et al.

FOREIGN PATENT DOCUMENTS

| JP | 2013-168295 A | 8/2013 |
| JP | 2014-32967 A | 2/2014 |

(Continued)

OTHER PUBLICATIONS

International Search Report dated Feb. 27, 2018, issued in counterpart International Application No. PCT/JP2017/044642 (2 pages).

*Primary Examiner* — Raymond Alejandro
(74) *Attorney, Agent, or Firm* — Westerman, Hattori, Daniels & Adrian, LLP

(57) ABSTRACT

A sealing body closes an opening of an energy storage device including an exterior can having the opening. The sealing body includes a metal plate, a gas discharging valve that is integrally formed with the metal plate and that opens when the inner pressure of the energy storage device increases to a predetermined pressure, and a ceramic layer that is disposed on a surface of the metal plate, the surface being an inner surface of the energy storage device, and that is disposed around the gas discharging valve.

6 Claims, 2 Drawing Sheets

(51) Int. Cl.
  *H01M 10/0525*  (2010.01)
  *H01M 50/186*  (2021.01)
  *H01M 50/191*  (2021.01)

(56) References Cited

FOREIGN PATENT DOCUMENTS

| | | |
|---|---|---|
| JP | 2014-135140 A | 7/2014 |
| JP | 2015-28870 A | 2/2015 |
| JP | 2016-96129 A | 5/2016 |

* cited by examiner

SEALING BODY AND NONAQUEOUS ELECTROLYTE SECONDARY BATTERY

TECHNICAL FIELD

The present disclosure relates to a sealing body and a nonaqueous electrolyte secondary battery including the sealing body.

BACKGROUND ART

Energy storage devices, such as nonaqueous electrolyte secondary batteries, include, for example, an exterior can that encases an electrode body and a nonaqueous electrolyte and include a sealing body that seals the opening of the exterior can. In many sealing bodies, a gas discharging valve that opens when the inner pressure of the energy storage device increases to a predetermined pressure is disposed. For example, Patent Literature 1 discloses a sealing body for energy storage devices. The sealing body includes a gas discharging valve welded to a tool-attaching hole. The Patent Literature 1 describes that an aluminum-based metal layer is disposed on the inner surface of the tool-attaching hole and around the gas discharging valve.

CITATION LIST

Patent Literature

PTL 1: Japanese Published Unexamined Patent Application No. 2014-135140

SUMMARY OF INVENTION

In energy storage devices including a conventional sealing body, when, for example, an internal short circuit occurs and the gas discharging valve operates and discharges a gas from the inside of the device, not only the gas discharging valve, but also a portion therearound may melt due to sparks, a high-temperature gas, or the like, that is generated in the device, and thus, the area from which the gas is discharged may increase. In such a case, the target gas discharging rate is not possibly maintained.

An object of the present disclosure is to provide a sealing body in which melting of a portion of the sealing body that is around a gas discharging valve can be suppressed, during occurrence of, for example, an internal short circuit, and to provide a nonaqueous electrolyte secondary battery including the sealing body.

A sealing body according to the present disclosure closes an opening of an energy storage device including an exterior can having the opening. The sealing body includes a metal plate, a gas discharging valve that is integrally formed with the metal plate and that opens when the inner pressure of the energy storage device increases to a predetermined pressure, and a ceramic layer that is disposed on a surface of the metal plate, the surface being an inner surface of the energy storage device, and that is disposed around the gas discharging valve.

A nonaqueous electrolyte secondary battery according to the present disclosure includes an exterior can having an opening, the sealing body, which closes the opening of the exterior can, and an electrode body and a nonaqueous electrolyte that are encased in the exterior can.

Due to the sealing body according to the present disclosure, when, for example, an internal short circuit occurs, melting of a portion of the sealing body that is around the gas discharging valve can be suppressed.

DESCRIPTION OF EMBODIMENTS

As described above, a gas discharging valve formed in the sealing body that closes the opening of the exterior can of an energy storage device fractures when, due to the occurrence of, for example, an internal short circuit, a high-temperature gas is generated and the inner pressure of the device increases. This leads to the opening of the gas discharging valve, and the gas in the device is discharged. However, when a large amount of the high-temperature gas or sparks are generated due to the occurrence of, for example, an internal short circuit, the gas discharging valve and, in addition, a portion therearound may melt. In such a case, the area from which the gas is discharged increases, and thus, a predetermined gas discharging rate is not possibly maintained.

The present inventors diligently carried out studies to suppress melting of a portion of the sealing body that is around the gas discharging valve and have found that disposing a ceramic layer in a portion of the sealing body that is around the gas discharging valve and that is on the inside suppresses melting of a portion of the sealing body that is around the gas discharging valve when a high-temperature gas or sparks are generated during the occurrence of, for example, an internal short circuit. As a result, the gas can be discharged from only the gas discharging valve at an appropriate rate. Melting of a portion of the sealing body that is around the gas discharging valve mainly starts at the edge of the gas discharging valve. Thus, it is considered that disposing a ceramic layer in a portion of the sealing body that is around the gas discharging valve and that is on the inside suppresses melting of a portion other than the valve efficiently.

Hereinafter, an exemplary embodiment will be fully described with reference to the drawings. The drawings referred to in the description of the embodiment are schematically illustrated. Thus, specific dimensions of each component should be understood with reference to the following description. In the present Description, "substantially" is used in the same manner as, for example, "substantially stable" including completely stable and essentially stable.

Hereinafter, a nonaqueous electrolyte secondary battery that includes a prismatic metal case (battery case) including an exterior can and a sealing body will be described as an example of energy storage devices. The energy storage devices are not limited to batteries and may be capacitors. The battery case may have another shape other than the prismatic shape.

Figure 1:
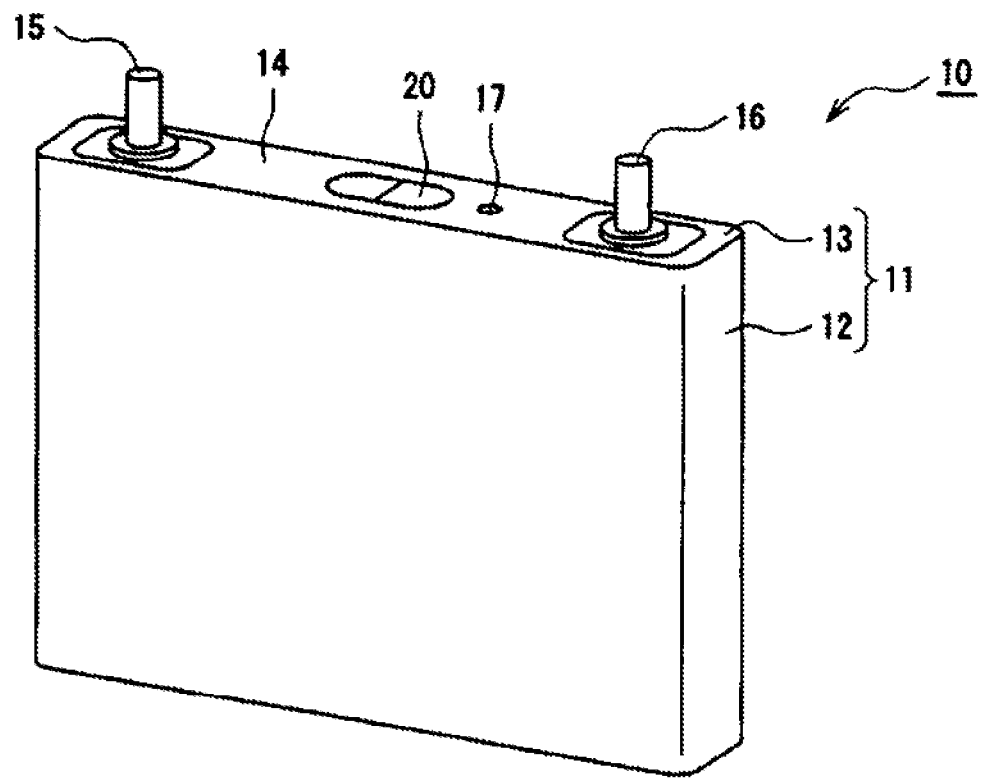
FIG. 1 is an external perspective view of an exemplary nonaqueous electrolyte secondary battery according to an embodiment.

FIG. 1 is an external perspective view of an exemplary nonaqueous electrolyte secondary battery 10 according to an embodiment. The nonaqueous electrolyte secondary battery 10 illustrated in FIG. 1 includes a battery case 11 including, for example, a closed-end prismatic exterior can 12 having an opening on the upper end and a sealing body 13 that closes the opening of the exterior can 12. The exterior can 12 encases an electrode body and a nonaqueous electrolyte. The nonaqueous electrolyte secondary battery 10 illustrated in FIG. 1 may be any type of battery and preferably a lithium ion battery. Hereinafter, a lithium ion battery will be described as an example.

The sealing body 13 illustrated in FIG. 1 includes a metal plate 14, a positive electrode external terminal 15, a negative electrode external terminal 16, an inflow portion 17, a gas discharging valve 20, and a ceramic layer that will be described later. Hereinafter, the direction in which the external terminals are aligned with each other is stated as "lateral direction", the direction of the thickness of the metal plate 14 is stated as "vertical direction", and the direction perpendicular to the lateral direction and the vertical direction is stated as "front-back direction".

The exterior can 12 illustrated in FIG. 1 has a flat shape in which dimensions in the lateral direction and the vertical direction are longer than the dimension in the front-back direction; however, the exterior can 12 may have any shape. The metal material contained in the exterior can 12 may be a metal material in which aluminum is a main constituent.

An electrode body encased in the exterior can 12 includes a positive electrode, a negative electrode, and a separator and has a structure in which leads are extended from the positive electrode and the negative electrode. The electrode body may be stacked-type or wound-type. The nonaqueous electrolyte contains a nonaqueous solvent and a lithium salt dissolved in the nonaqueous solvent. Examples of the nonaqueous solvent include cyclic carbonates, linear carbonates, carboxylates, and halogen-substituted derivatives in which hydrogen atoms of these compounds are substituted by halogen atoms, such as fluorine atoms.

As an active material in the positive electrode, a lithium composite oxide may be used. A preferable exemplary lithium composite oxide is a Ni—Co—Mn-based or Ni—Co—Al-based lithium composite oxide. The negative electrode active material may be any material that reversibly includes and releases lithium ions and may be a carbon material, such as natural graphite or synthetic graphite, a metal that is alloyed with lithium, such as Si or Sn, an alloy, or a composite oxide.

Hereinafter, the components of the sealing body 13 will be described.

The metal plate 14 included in the sealing body 13 is a member for closing the opening of the exterior can 12 to seal the inner space of the exterior can 12. The metal plate 14 has a shape corresponding to the shape of the opening of the exterior can 12. In the example illustrated in FIG. 1, the metal plate 14 has a substantially rectangular shape in which a dimension in the lateral direction is longer than a dimension in the front-back direction. The sealing body 13 is attached to the exterior can 12, for example, by welding the peripheral portion of the metal plate 14 to the opening of the exterior can 12.

The metal plate 14 contains a metal material, such as aluminum, iron, or stainless steel. From the viewpoint of, for example, weight reduction, the metal plate 14 preferably contains a metal material in which aluminum is a main constituent. The metal material may be aluminum or an aluminum alloy and has an aluminum content of 90 weight % or more.

From the viewpoint of, for example, the strength and heat resistance of the sealing body 13, the thickness of the metal plate 14 is preferably larger than the thickness of the gas discharging valve 20 and, for example, is preferably within the range of 1 mm to 5 mm and more preferably within the range of 1.5 mm to 3 mm.

In the example illustrated in FIG. 1, the positive electrode external terminal 15 is disposed on one end portion of the metal plate 14 in the lateral direction, and the negative electrode external terminal 16 is disposed on the other end portion in the lateral direction. For example, a through hole is formed in each end portion of the metal plate 14 in the lateral direction. The positive electrode external terminal 15 and the negative electrode external terminal 16 are attached to the respective through holes with an insulative gasket disposed between each electrode terminal and the plate and are thus in a state of being electrically insulated from the metal plate 14. To each of the external terminals, a lead extended from the electrode body is directly connected or is connected with another current collecting member disposed between the external terminal and the lead. The battery may have another structure in which a single external terminal is disposed as the negative electrode external terminal on the metal plate 14 and in which the exterior can 12 is used as the positive electrode external terminal.

When the inner pressure of the nonaqueous electrolyte secondary battery 10 increases to a predetermined pressure due to the occurrence of, for example, an internal short circuit, the gas discharging valve 20 fractures, and the gas in the nonaqueous electrolyte secondary battery 10 is discharged from an opening formed by the fracture. The gas discharging valve 20 is integrally formed with the metal plate 14 by a process, such as a coining process. Another process for forming the gas discharging valve 20 integrally with the metal plate 14 may include forming an opening in the metal plate 14 that is substantially identical to the gas discharging valve 20 in shape and size, disposing the gas discharging valve 20 at the opening, and welding the metal plate 14 and the gas discharging valve 20 to each other. Considering, for example, the easiness of forming the gas discharging valve 20 integrally with the metal plate 14, the gas discharging valve 20 preferably contains a metal material and more preferably contains a metal material the same as the metal material of the metal plate 14.

To discharge the gas smoothly, for example, the gas discharging valve 20 is preferably formed between the positive electrode external terminal 15 and the negative electrode external terminal 16 and more preferably at a position substantially the same distance away from the positive electrode external terminal 15 and the negative electrode external terminal 16.

The inflow portion 17 typically includes an inflow hole for pouring of an electrolyte solution and a sealing plug that closes the inflow hole. The inflow portion 17 may be disposed at any position in the metal plate 14 and may be formed between the negative electrode external terminal 16 and the gas discharging valve 20. The inflow portion 17 may be formed in the surface of the exterior can 12.

Hereinafter, the gas discharging valve 20 and a ceramic layer 22 will be described with reference to FIG. 2 and FIG. 3.

Figure 2:
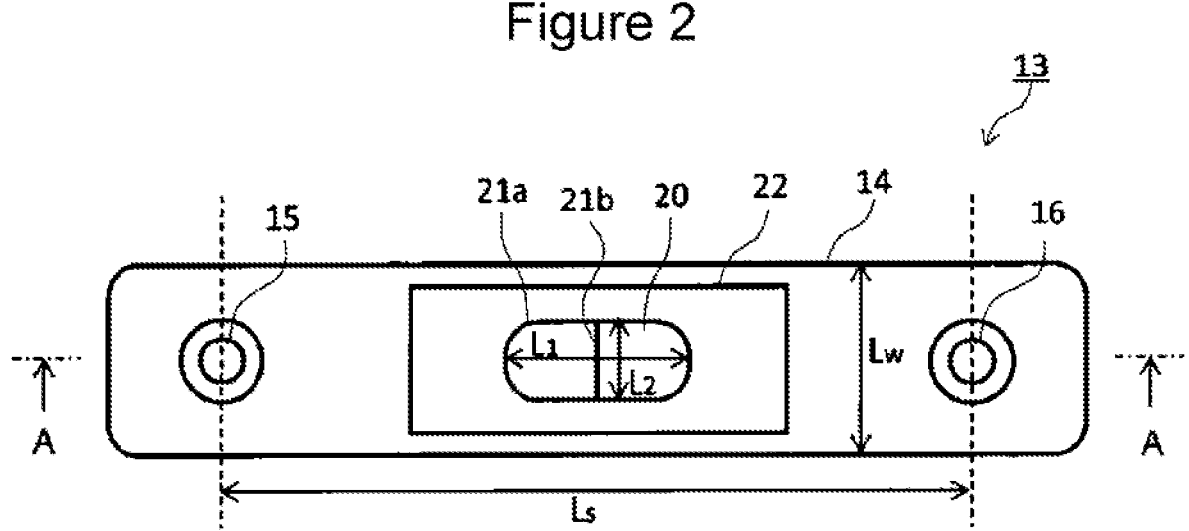
FIG. 2 is a plan view of a sealing body when viewed from the inside of an exemplary nonaqueous electrolyte secondary battery according to an embodiment.
Figure 3:
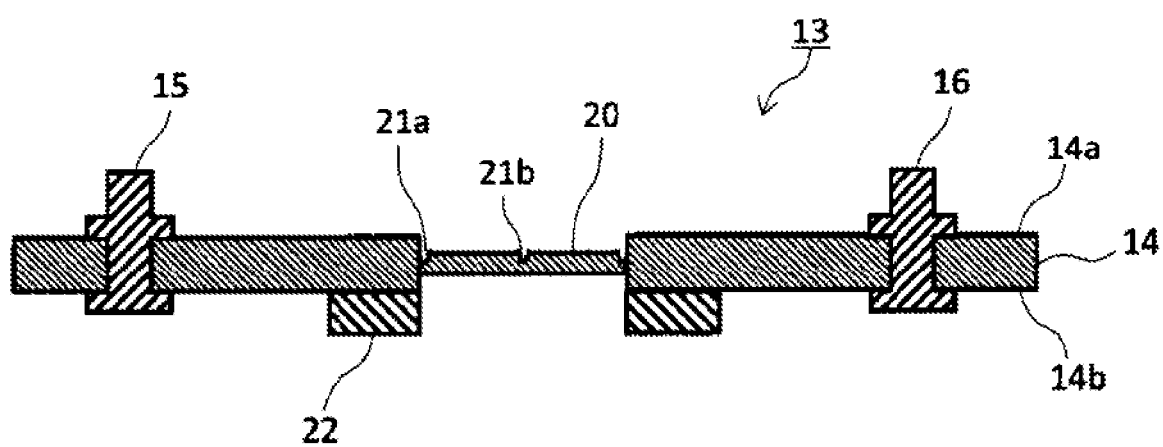
FIG. 3 is a cross-sectional view taken along the line A-A in FIG. 2.

FIG. 2 is a plan view of the sealing body 13 when viewed from the inside of the nonaqueous electrolyte secondary battery 10. In other words, the surface of the metal plate 14 illustrated in FIG. 2 is an inner surface of the nonaqueous electrolyte secondary battery 10 (i.e., an inner surface of the battery case 11). FIG. 3 is a cross-sectional view taken along the line A-A in FIG. 2. An upper surface 14a of the metal plate 14 in FIG. 3 is an outer surface of the nonaqueous electrolyte secondary battery 10 (i.e., an outer surface of the battery case 11). A lower surface 14*b* of the metal plate 14 in FIG. 3 is an inner surface of the nonaqueous electrolyte secondary battery 10 (i.e., an inner surface of the battery case 11) and is the surface of the metal plate 14 illustrated in FIG. 2. In FIG. 2 and FIG. 3, the inflow portion 17, the insulative gasket disposed between the metal plate 14 and the positive electrode external terminal, and the insulative gasket disposed between the metal plate 14 and the negative electrode external terminal are not illustrated.

The gas discharging valve 20 preferably includes, on the upper surface thereof, an annular recess portion 21*a* formed along the edge of the gas discharging valve 20. The gas discharging valve 20 preferably includes a linear recess portion 21*b* in the center portion of the annular recess portion 21*a* in the lateral direction. The recess portion 21*b* extends in the front-back direction, and both ends of the recess portion 21*b* are connected to the annular recess portion 21*a*. The recess portions (21*a* and 21*b*) are thinner than other portions. Thus, when, for example, an internal short circuit occurs and the inner pressure of the nonaqueous electrolyte secondary battery 10 increases, such thinner portions readily fracture, and the gas discharging valve 20 can be readily opened.

The gas discharging valve 20 may have any shape and preferably has a rectangular shape with rounded corners that is longer in the lateral direction, for example. If the gas discharging valve 20 has an angular potion in the edge thereof, such a potion readily fractures. Thus, the gas discharging valve 20 preferably has no angular potions in the edge thereof.

The size of the gas discharging valve 20 is determined such that the valve can discharge the gas at an appropriate rate during the occurrence of, for example, an internal short circuit. In a lithium ion battery having an energy density of 200 Wh/kg, for example, from the viewpoint of reliably obtaining the strength of the gas discharging valve 20, it is preferable that $L_2/Lw=½$ to ¼ when the width of the metal plate 14 is expressed by Lw and the length of the gas discharging valve 20 in the front-back direction (length in the transverse direction) is expressed by $L_2$. From the viewpoint of the gas discharging efficiency, it is preferable that $L_2/L_1=½$ to ¼ when the length of the gas discharging valve 20 in the lateral direction (length in the longitudinal direction) is expressed by $L_1$.

The gas discharging valve 20 may have any thickness provided that the gas discharging valve 20 opens when the inner pressure of the nonaqueous electrolyte secondary battery 10 increases to a predetermined pressure. For example, the gas discharging valve 20 preferably has a thickness within the range of 0.05 mm to 1 mm and more preferably within the range of 0.1 mm to 0.5 mm.

The ceramic layer 22 is disposed on the lower surface 14*b* of the metal plate 14, in other words, on a surface of the metal plate 14, the surface being an inner surface of the nonaqueous electrolyte secondary battery 10 (an inner surface of the battery case 11), and is disposed all around the gas discharging valve 20 so as to surround the valve. The ceramic layer 22 has heat resistance. Thus, when, for example, an internal short circuit occurs, the ceramic layer 22 protects a portion of the metal plate 14 that is around the gas discharging valve 20 from, for example, a high-temperature gas and sparks, and melting of the portion of the metal plate 14 can be suppressed. In a nonaqueous electrolyte secondary battery, such as a lithium ion battery, the temperature of a gas generated during the occurrence of, for example, an internal short circuit is typically 700° C. or higher, and the temperature of sparks generated during the occurrence of, for example, an internal short circuit is higher and may be 900° C. or higher. The appropriate gas discharging time is typically 1 to 30 seconds. Considering these facts, the ceramic layer 22 desirably has heat resistance such that the ceramic layer 22 does not melt at least for 1 to 30 seconds at preferably 700° C. or higher and more preferably 900° C. or higher.

The ceramic layer 22 is preferably disposed on a potion a predetermined distance away from the edge of the metal plate 14 so as not to disturb the welding between the exterior can 12 and the sealing body 13. In particular, when the metal plate 14 has a substantially rectangular shape, the distance from the end portion of the metal plate 14 in the longitudinal direction to the gas discharging valve 20 (distance in the front-back direction) is likely to be shorter than the distance from the end portion of the metal plate 14 in the transverse direction to the gas discharging valve 20 (distance in the lateral direction). Thus, the ceramic layer 22 is likely to interfere with the end portion of the metal plate 14 in the longitudinal direction and a portion of the exterior can 12 that is welded to such an end portion. Therefore, between the end portion of the metal plate 14 in the longitudinal direction and the ceramic layer 22, for example, a margin within the range of 2 mm or less is preferably formed. A margin within the range of 0.01 to 2 mm is more preferably formed, and a margin within the range of 0.5 to 1 mm is still more preferably formed.

When the ceramic layer 22 is disposed around the gas discharging valve 20, which is formed between the positive electrode external terminal 15 and the negative electrode external terminal 16, the ceramic layer 22 preferably has an area within the range of 10% to 80% and more preferably within the range of 15% to 65% relative to the area of a portion of the sealing body 13 that is between the positive electrode external terminal 15 and the negative electrode external terminal 16. Here, the area of a portion of the sealing body 13 that is between the positive electrode external terminal 15 and the negative electrode external terminal 16 is determined by Ls×Lw. Ls is the length from the center of the positive electrode external terminal 15 to the center of the negative electrode external terminal 16, and Lw is the width of the metal plate 14. The area of the ceramic layer 22 is 10% or more relative to the area of a portion of the sealing body 13 that is between the positive electrode external terminal 15 and the negative electrode external terminal 16, and thus, melting of a wider portion of the metal plate 14 that is around the gas discharging valve 20 can be suppressed. From the viewpoint of suppressing the melting of the metal plate 14, the area of the ceramic layer 22 may be more than 80% relative to the area of a portion of the sealing body 13 that is between the positive electrode external terminal 15 and the negative electrode external terminal 16; however, from the viewpoint of avoiding interference with a lead or a current collecting member in the battery, the area is preferably 80% or less.

The ceramic layer 22 may have any thickness and, for example, is preferably within the range of 0.5 mm to 10 mm and more preferably within the range of 1 mm to 3 mm. If the ceramic layer 22 has a thickness of less than 0.5 mm, it may be difficult to have sufficient heat resistance reliably. If the ceramic layer 22 has a thickness of more than 10 mm, interference with a lead, the electrode body, or a current collecting member in the battery may occur.

The ceramic layer 22 contains a ceramic material. Examples of the ceramic material include oxides, nitrides, carbides, and borides of a metal element, such as aluminum or titanium. Specific examples include aluminum oxide, silicon carbide, boron carbide, titanium nitride, silicon nitride, titanium boride, and titanium carbide. From the viewpoint of, for example, heat resistance, material cost, and formability, the ceramic layer 22 preferably contains a ceramic material in which aluminum oxide is a main constituent. The ceramic layer 22 preferably has an aluminum oxide content of 90 weight % or more, for example.

The ceramic layer 22 may have any form and may be a ceramic plate or a ceramic film. The ceramic plate may be formed by gathering ceramic material particles and applying pressure and heat thereto. For example, an adhesive is applied to the formed ceramic plate, and the ceramic plate is bonded to a predetermined position of the lower surface 14*b* of the metal plate 14. The ceramic film may be formed by applying a slurry containing the ceramic material and a binder to a predetermined position of the lower surface 14*b* of the metal plate 14. The binder is preferably an organic or inorganic binder having heat resistance. The organic binder may be polyvinylidene fluoride. The inorganic binder may be an alkali metal silicate-based binder, a silica sol-based binder, or a silicone resin-based binder.

As described above, the nonaqueous electrolyte secondary battery 10 including the sealing body 13 in the present embodiment has the ceramic layer 22, which is disposed on a surface of the metal plate 14, the surface being an inner surface of the nonaqueous electrolyte secondary battery 10, and which is disposed around the gas discharging valve 20. Thus, melting of a portion of the metal plate 14 that is around the gas discharging valve 20, due to a high-temperature gas, sparks, or the like, that is generated during the occurrence of, for example, an internal short circuit, is suppressed. As a result, the gas can be discharged from only the gas discharging valve 20 at an appropriate rate.

The above embodiment can be appropriately modified provided that an object of the present disclosure is not impaired.

REFERENCE SIGNS LIST

10 nonaqueous electrolyte secondary battery
11 battery case
12 exterior can
13 sealing body
14 metal plate
14*a* upper surface
14*b* lower surface
15 positive electrode external terminal
16 negative electrode external terminal
17 inflow portion
20 gas discharging valve
21*a*, 21*b* recess portion
22 ceramic layer

The invention claimed is:

1. A sealing body that closes an opening of an energy storage device including an exterior can having the opening, the sealing body comprising:
   a metal plate that closes the opening;
   a gas discharging valve that is integrally formed with the metal plate, that opens when an inner pressure of the energy storage device increases to a predetermined pressure, and that is formed in a thin area of the metal plate; and
   a ceramic layer that is disposed on a surface of the metal plate, the surface being an inner surface of the energy storage device and located on a thick area of the metal plate, and that is disposed around the gas discharging valve, wherein
   a surface of the ceramic layer is exposed to an interior of the energy storage device, and
   the ceramic layer is disposed between a positive electrode external terminal and a negative electrode external terminal that are disposed on the metal plate and is in contact with a portion of the sealing body,
   wherein the thick area of the metal plate is thicker than the thin area of the metal plate, and
   wherein the ceramic layer viewed in a thickness direction of the metal plate has a ring shape which contacts a surface of the thick area.

2. The sealing body according to claim 1, wherein the metal plate has a substantially rectangular shape, and a margin of 2 mm or less is formed between an end portion of the metal plate in a longitudinal direction and the ceramic layer.

3. The sealing body according to claim 1, wherein the metal plate contains a metal material in which aluminum is a main constituent.

4. The sealing body according to claim 1, wherein the ceramic layer contains a ceramic material in which an aluminum oxide is a main constituent.

5. The sealing body according to claim 1, wherein the ceramic layer is directly disposed on the metal plate.

6. A nonaqueous electrolyte secondary battery comprising:
   an exterior can having an opening;
   the sealing body according to claim 1, which closes the opening of the exterior can; and
   an electrode body and a nonaqueous electrolyte that are encased in the exterior can.

* * * * *